(12) United States Patent
Skoog et al.

(10) Patent No.: US 7,313,909 B2
(45) Date of Patent: Jan. 1, 2008

(54) HIGH-EMISSIVITY INFRARED COATING APPLICATIONS FOR USE IN HIRSS APPLICATIONS

(75) Inventors: Andrew Jay Skoog, West Chester, OH (US); Jane Ann Murphy, Middletown, OH (US); John Michael Jasany, Cincinnati, OH (US); Aaron Dennis Gastrich, Loveland, OH (US); Timothy Lance Manning, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 10/972,552

(22) Filed: Oct. 25, 2004

(65) Prior Publication Data

US 2006/0086077 A1    Apr. 27, 2006

(51) Int. Cl.
*F02C 7/08* (2006.01)
(52) U.S. Cl. ........................................ 60/39.5
(58) Field of Classification Search ........... 60/39.5
See application file for complete search history.

(56) References Cited

U.S. PATENT DOCUMENTS

| | | | |
|---|---|---|---|
| 4,055,705 A | 10/1977 | Stecura et al. | |
| 4,295,332 A * | 10/1981 | Steyer et al. | 60/264 |
| 4,462,883 A | 7/1984 | Hart | |
| 4,566,270 A * | 1/1986 | Ballard et al. | 60/264 |
| 5,169,674 A | 12/1992 | Miller | |
| 5,176,964 A | 1/1993 | Marousek et al. | |
| 5,229,881 A | 7/1993 | Day et al. | |
| 5,683,825 A | 11/1997 | Bruce et al. | |
| 5,699,662 A * | 12/1997 | Born et al. | 60/39.5 |
| 5,723,078 A | 3/1998 | Nagaraj et al. | |
| 5,851,679 A | 12/1998 | Stowell et al. | |
| 5,942,334 A | 8/1999 | Wortman | |
| 6,253,540 B1 * | 7/2001 | Chew et al. | 60/262 |
| 6,465,090 B1 | 10/2002 | Stowell et al. | |
| 6,491,967 B1 | 12/2002 | Corderman et al. | |
| 6,971,240 B2 * | 12/2005 | Wollenweber | 60/772 |
| 6,988,674 B2 * | 1/2006 | Steyer et al. | 239/265.19 |
| 2006/0088727 A1 * | 4/2006 | Skoog et al. | 428/670 |
| 2007/0028623 A1 * | 2/2007 | Steyer et al. | 60/772 |

FOREIGN PATENT DOCUMENTS

| | | |
|---|---|---|
| JP | 55002754 | 1/1980 |
| JP | 59034124 | 2/1984 |
| JP | 60134126 | 7/1985 |
| JP | 60155267 | 8/1985 |

* cited by examiner

*Primary Examiner*—William H. Rodriguez
(74) *Attorney, Agent, or Firm*—McNees Wallace & Nurick LLC

(57) ABSTRACT

A high emissivity (Hi-E) coating for use on the exhaust baffles of HIRSS systems. HIRSS systems were developed to reduce the infrared (IR) signature of helicopter engines. Increasing operating temperatures of helicopter engines have made the HIRSS systems less effective. An infrared coating applied over selected portions of the HIRSS reduces the IR of the system. The Hi-E coating comprises, in weight percent, 30-80% refractory oxide pigment, 5-20% binder, 1-15% potassium oxide, optionally up to about 15% glass-forming material and the balance refractory oxide powder. When applied to provide a surface finish of $1100R_a$ micro-inches or coarser, the coated HIRSS has a significantly reduced hemispherical reflectance in the IR frequency range.

20 Claims, 10 Drawing Sheets

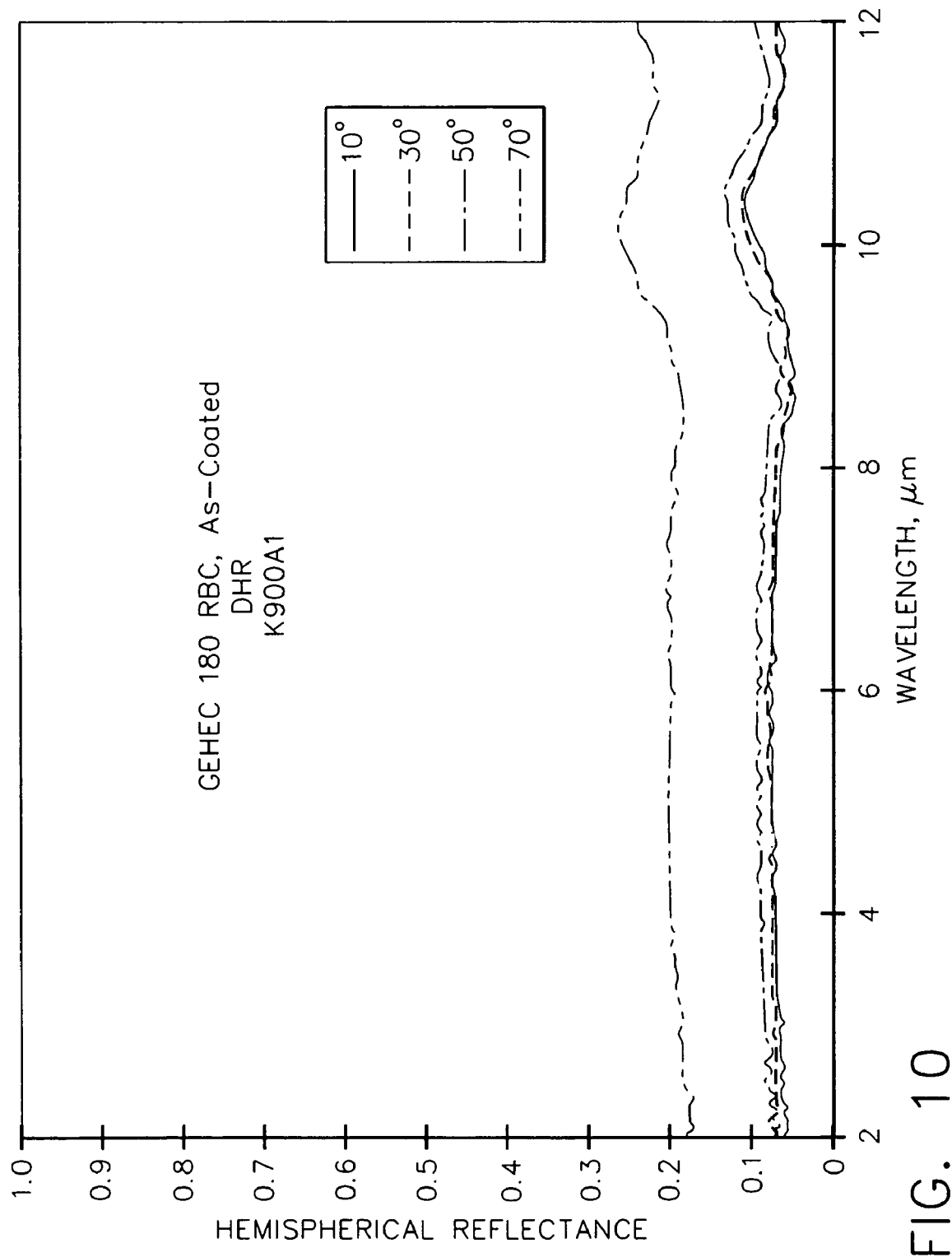

HIGH-EMISSIVITY INFRARED COATING APPLICATIONS FOR USE IN HIRSS APPLICATIONS

FIELD OF THE INVENTION

The present invention is directed to a high emissivity coatings for use in HIRSS applications, and specifically to the use of the high emissivity coatings for use in T-700 helicopter engines employing HIRSS hardware.

BACKGROUND OF THE INVENTION

HOVER INFRARED SUPPRESSION SYSTEMS (HIRSS) were developed to reduce the infrared (IR) signature of helicopter engines. These systems have been employed to reduce the infrared emissions of the exhaust from engines employed in helicopter applications, such as the General Electric T-700 engine employed in every helicopter designs such as for example, the Black Hawk UH-60, the Apache AH-64 and the AH-1, among others, in use by the U.S. Military. The HIRSS systems have been successful in reducing the IR signature without the benefit of high emissivity coatings (Hi-E), but IR emissions have not been completely eliminated. Because the "threat systems" (heat seeking missile technology, for example) is constantly improving, and because engine temperatures are constantly increasing, resulting in higher exhaust temperatures, it is necessary to further improve the IR signature of such engines to neutralize these threats.

Infrared suppression systems such as the HIRSS are known and have been in use for some time. U.S. Pat. No. 6,253,540 to Chew et al. assigned to the assignee of the present invention, discloses an apparatus for suppressing infrared radiation emitted from the aft end of a gas turbine engine. The system features a mechanical arrangement of baffles connected together to mix hot and cool gas flow together to affect the line-of-sight infrared radiation signature of the exhaust. Additional improvements have been made to these HIRSS. While these improvements have been effective in suppressing infrared radiation, the continued improvement in engine operating temperature as well as improvements in detection by advances in threat systems have made engines operating even with improved HIRSS systems increasingly vulnerable. What is need is HIRSS system that suppresses infrared radiation emitted by engines used in helicopter technology such as the GE T-700 engines

SUMMARY OF THE INVENTION

The present invention utilizes a high emissivity (Hi-E) coating applied to the exhaust baffles and portions of the liners of HIRSS systems. The Hi-E coating absorbs infrared radiation (IR) and dissipates it so that the IR performance of existing HIRSS systems can be improved, making them much less detectable to threat systems that utilize infrared (IR) detection techniques to track and locate aircraft utilizing such engines, and to target them for destruction.

Heated bodies radiate energy. The amount of energy emitted by a particular material is a characteristic of the material and depends on the temperature of the material. The amount of radiation emitted by a heated body is its emissivity, which can be measured at various temperatures. As metals are heated, the wavelength at which energy is emitted becomes shorter. Heated metal surfaces emit radiation in the IR range of 2-12 microns when heated sufficiently. The present invention is a coating applied to metal surfaces that raises the emissivity of the surface to which it is applied so that in the temperature range of operation, for the gas turbine engines of the present invention, 1800° F. and lower, the surface to which the coating is applied is altered by changing its emissivity so that significantly more energy is absorbed and less energy is emitted in the infrared wavelength range in the temperature range of operation. Thus, the present invention reduces the infrared emissions from the engine, thereby making detection by infrared detection devices more difficult, thereby reducing the infrared signature of the invention.

The Hi-E coating is applied to the rear portion of the engine, which can include the stage 2 liner, so that the materials comprising the structures facing outwardly ideally do not emit IR as they are exposed to the operating temperatures of the engine, or if they do, the emitted IR is severely reduced. These structures include the baffles that have been designed to mix cool and hot air as well as the exhaust nozzle surfaces or shroud that have line-of-sight observability from the rear of the engine.

The effective coating composition for suppression of IR comprises, in weight percent about 30-80% refractory oxide pigment, optionally up to about 15% of a glass-forming material, about 5-20% binder, about 1-15% potassium oxide ($K_2O$) and the balance refractory oxide powder. The material is applied as a thin coating over these baffles and exhaust nozzle surfaces. Because of the location in the exhaust nozzle of the engine, the coating material, in order to be survivable, must, in addition to being able to affect the infrared radiation, be erosion resistant as the gases passing over the coating travel at a high velocity, providing the shaft rotation that moves the aircraft's rotors. The coating material also must be resistant to environmental damage such as corrosion and/or oxidation at high temperatures, as the exhaust gases of a gas turbine engine includes, in addition to the products of combustion, all of the impurities that are in jet fuel, such as JP-8. The temperature that the coating of the present invention, as applied to the HIRSS of the present invention is expected to experience is up to about 1800° F. Thus, the coating formulation is engineered to survive temperatures of about 1800° F. without experiencing degradation in performance.

The primary advantage of the present invention is that the coating does improve the IR performance of the materials to which it is applied, thereby reducing or eliminating the likelihood that the material will emit infrared radiation, thereby allowing detection of the engine and hence the aircraft.

Another advantage of the present invention is that the coating can be applied to the existing HIRSS and other exhaust components of engines so equipped and immediately improve the IR performance of such engines without the need to upgrade the mechanical components of the engines. Alternatively, the coating of the present invention can be applied to any newly improved HIRSS and other exhaust components of engines, thereby increasing the temperature range over which the engine can perform without detection by IR-seeking devices.

A secondary advantage of the present invention is that it readily can be applied to as-manufactured engine components with little preparation, except for cleaning. The coating of the present invention can conveniently be applied by spraying, although other methods such as brushing or dipping can also be used. By proper selection of materials, the coating of the present invention can be cast as a tape and applied in that form if so desired.

Still another advantage of the present invention is that the material applied to the HIRSS and other components of the exhaust system is readily repairable if it should be subject to foreign object damage (FOD) or damage as a result of use over time.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 10 is a graph of the hemispherical reflectance v. infrared wavelength of an Inconel 625 surface coated with the Hi-E coating of the present invention at ambient temperature.

DETAILED DESCRIPTION OF THE INVENTION

Figure 1:
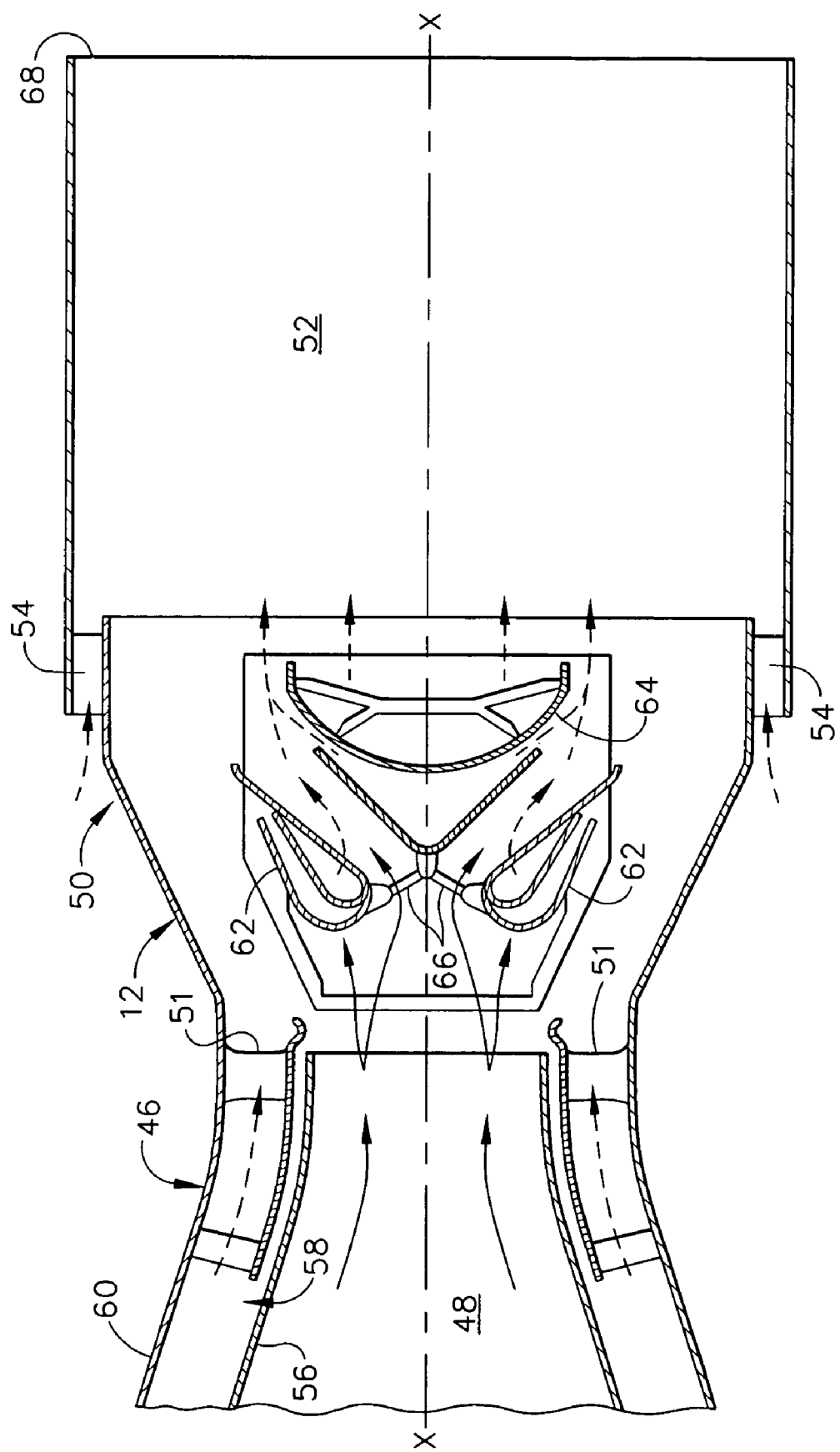
FIG. 1 depicts a cross-sectional schematic view of the prior art infrared suppression system as set forth in U.S. Pat. No. 6,253,540.

The present invention is directed for use on a gas turbine engine of the conventional turboshaft type, but its use is not so limited, and it may be used with other types of gas turbine engines such as turbofan and turboprop engines. FIG. 1 depicts a cross-sectional schematic view of a prior art infrared suppression system for use in a gas turbine engine of the conventional turboshaft type, such as the GE T-700, wherein the power turbine shaft may be connected to drive rotor blades of a helicopter. This infrared suppression system utilizes a mechanical arrangement of baffles to achieve the improvement in IR performance to mix hot and cool gases while eliminating line of sight IR so as to improve engine performance. The system achieve its improved IR performance without the use of Hi-E materials. While the system provided an acceptable solution for its time, the current infirmities with the system are discussed above. FIG. 1 is set forth fully in U.S. Pat. No. 6,253,540, ('540 Patent) incorporated herein by reference, and the numeric identification of features is as set forth in the '540 Patent. The baffle system breaks down a single hot exhaust gas flow stream into four distinct flow streams. In the process of breaking down the single flow stream, the baffles also draw in cooling air into the opening means while blocking line of sight IR from the rear of the exhaust. The baffle is provided as a readily removable module in the present invention.

Figure 2:
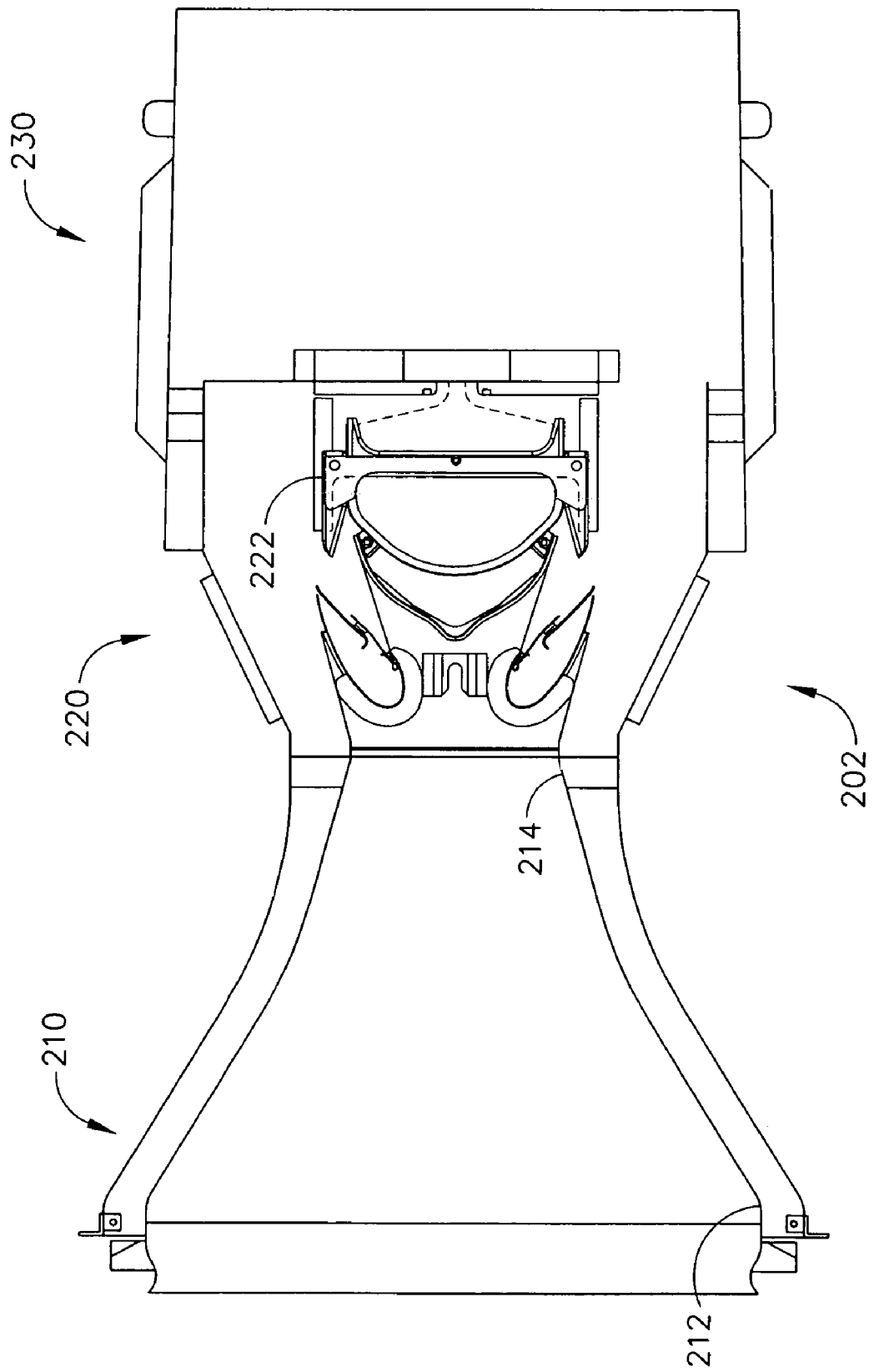
FIG. 2 is a cross-sectional view, depicting the mechanical configuration of the present HIRSS.

FIG. 2 is a cross section of the current HIRSS design 202. The current HIRSS includes the same overall configuration as the prior art IR suppression system of FIG. 1, although the specific features of the components are different. The HIRSS design of FIG. 2 includes a first stage 210, a transition section having a circular cross section 212 at the upstream end, which receives the hot gases of combustion exiting the turbine section of the engine. The first stage transitions to a rectangular cross section 214 at its downstream end where it mates with the second stage 220. The second stage 220, intermediate between the first stage 210 and the third stage 230, includes the baffle system 222. The final stage 230 is a downstream duct through which the exhaust gases leave the engine and are exhausted into ambient air.

Figure 3:
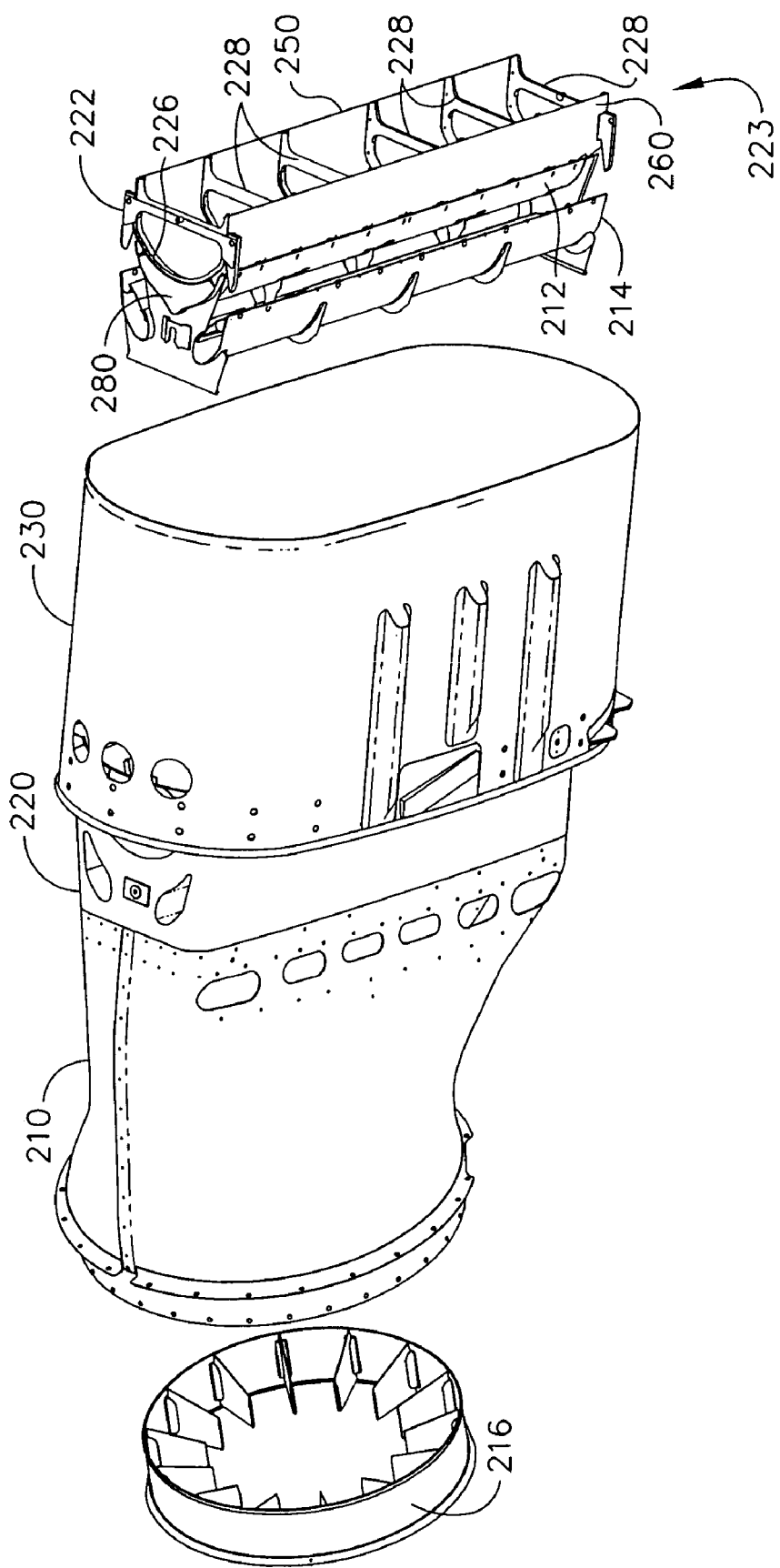
FIG. 3 is an exploded view of the present HIRSS.

Referring now to FIG. 3, there is shown an exploded view of the HIRSS of the present invention. The HIRSS of the present invention includes a stage one deswirler 216. The deswirler 216 directs the exhaust flow from the turbine portion of the engine, assisting in the mixing of the air. This mechanical component is not affected by the improvements provided by the present invention. Removable baffle assembly 222 is also shown.

Figure 4:
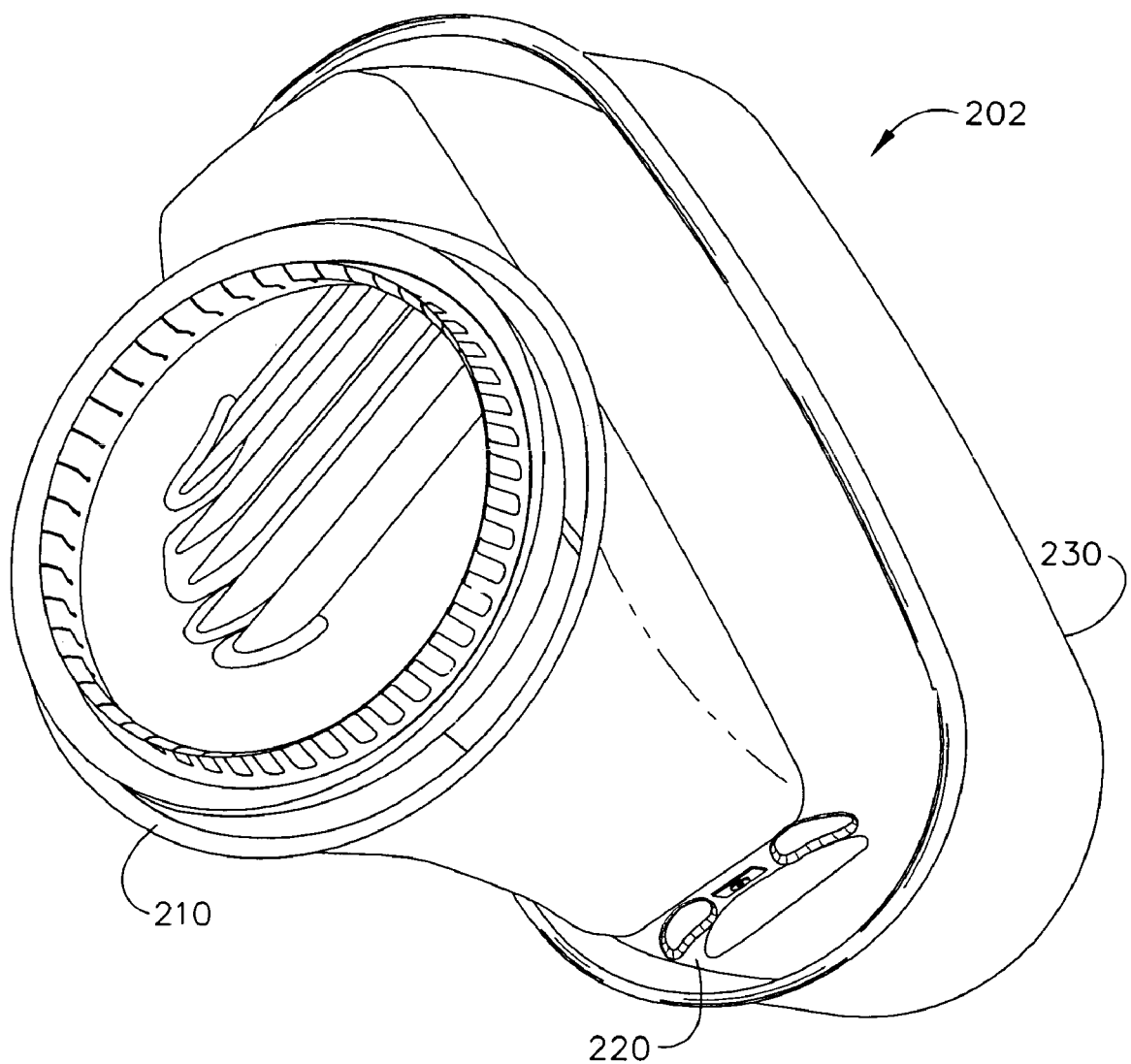
FIG. 4 is a perspective view of the HIRSS of the present invention, with a view into the first stage.

FIG. 4 is a perspective view of the HIRSS of the present invention, showing the HIRSS from the inlet end, that is, where the exhaust from the turbine portion of the engine enters the first stage 220.

Figure 5:
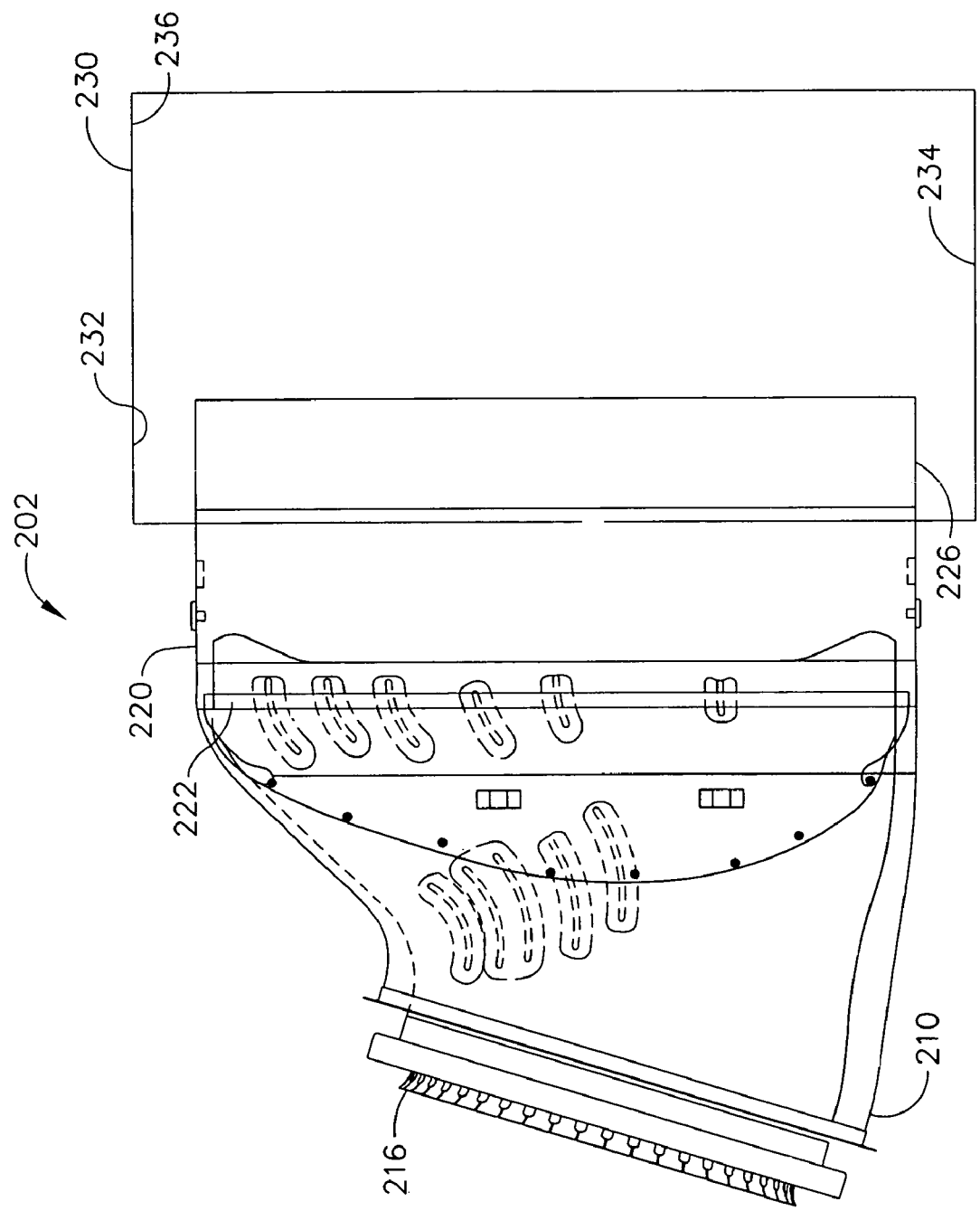
FIG. 5 is a cut-away view of the HIRSS of the present invention, showing the assembled deswirler and the baffle assembly.

FIG. 5 is a cut-away view of the HIRSS of the present invention, showing the assembled deswirler 216 and the baffle assembly 222. The downstream end 224 of the second stage 220 forms a flange 226 that extends into or overlaps the upstream end 232 of the third stage 230. Even with the mechanical improvements to the HIRSS system, because of improvements in threat technology and increases in engine temperature, this flange 226 has been determined to be a source of IR. To further reduce the infrared signature of the present invention, the coating material of the present invention has been applied to the flange surface, along the inner diameter of the flange 226 of the second stage 220 that is exposed to the hot gases of combustion. The coating material is also applied to the inside surface 210 of stage 2. Although the coating material adds to the weight of the assembly, this weight increase is offset by the signature reduction from this flange surface. The coating material is not required along the inner diameter 236 of the third stage 230 at its downstream end 234, downstream of the flange because cooling air mixed with the exhaust gases is sufficient to prevent the inner diameter 236 of the third stage 230 from being heated sufficiently so as to become an emitter of IR.

Figure 6:
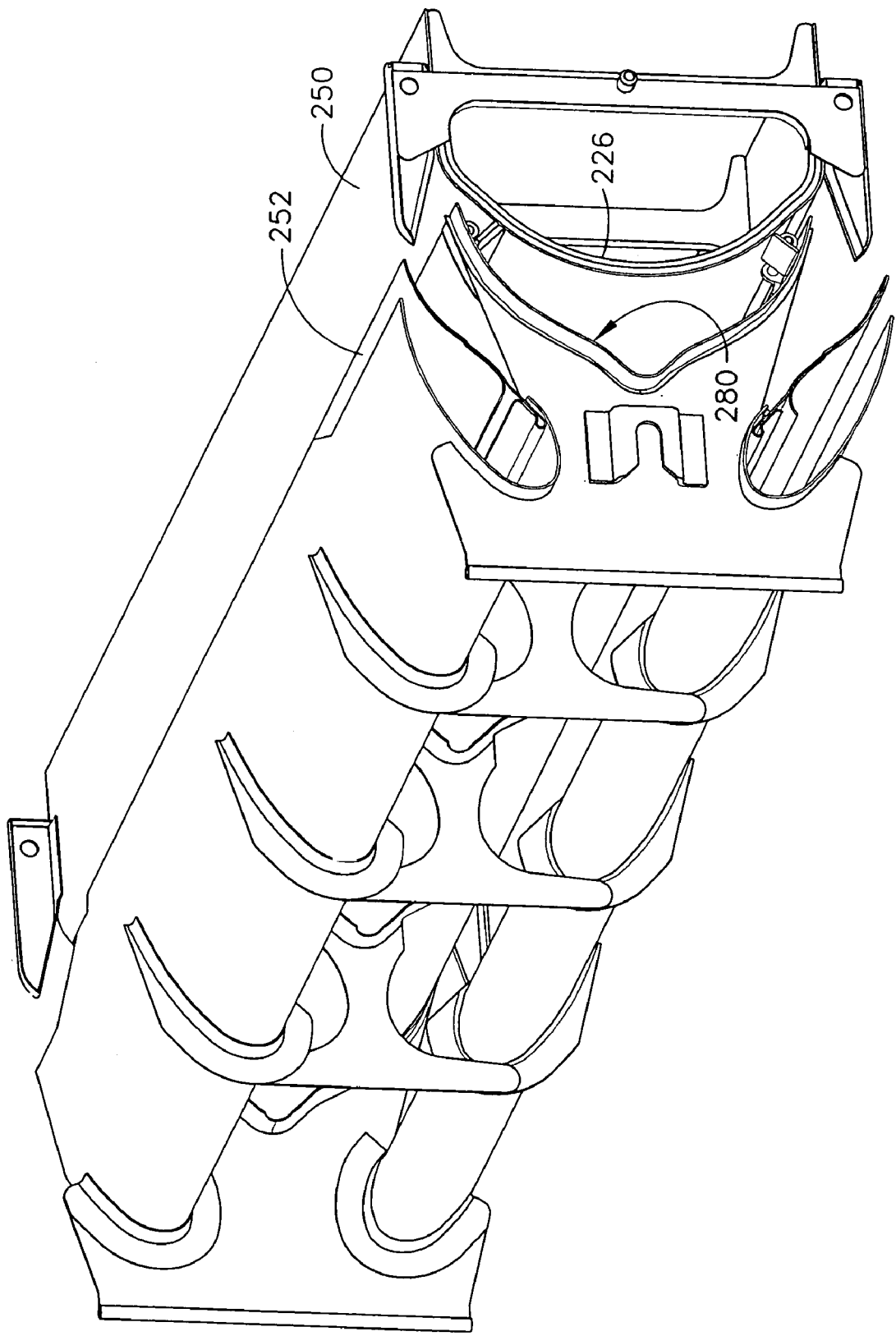
FIG. 6 is a perspective view of a baffle assembly.
Figure 7:
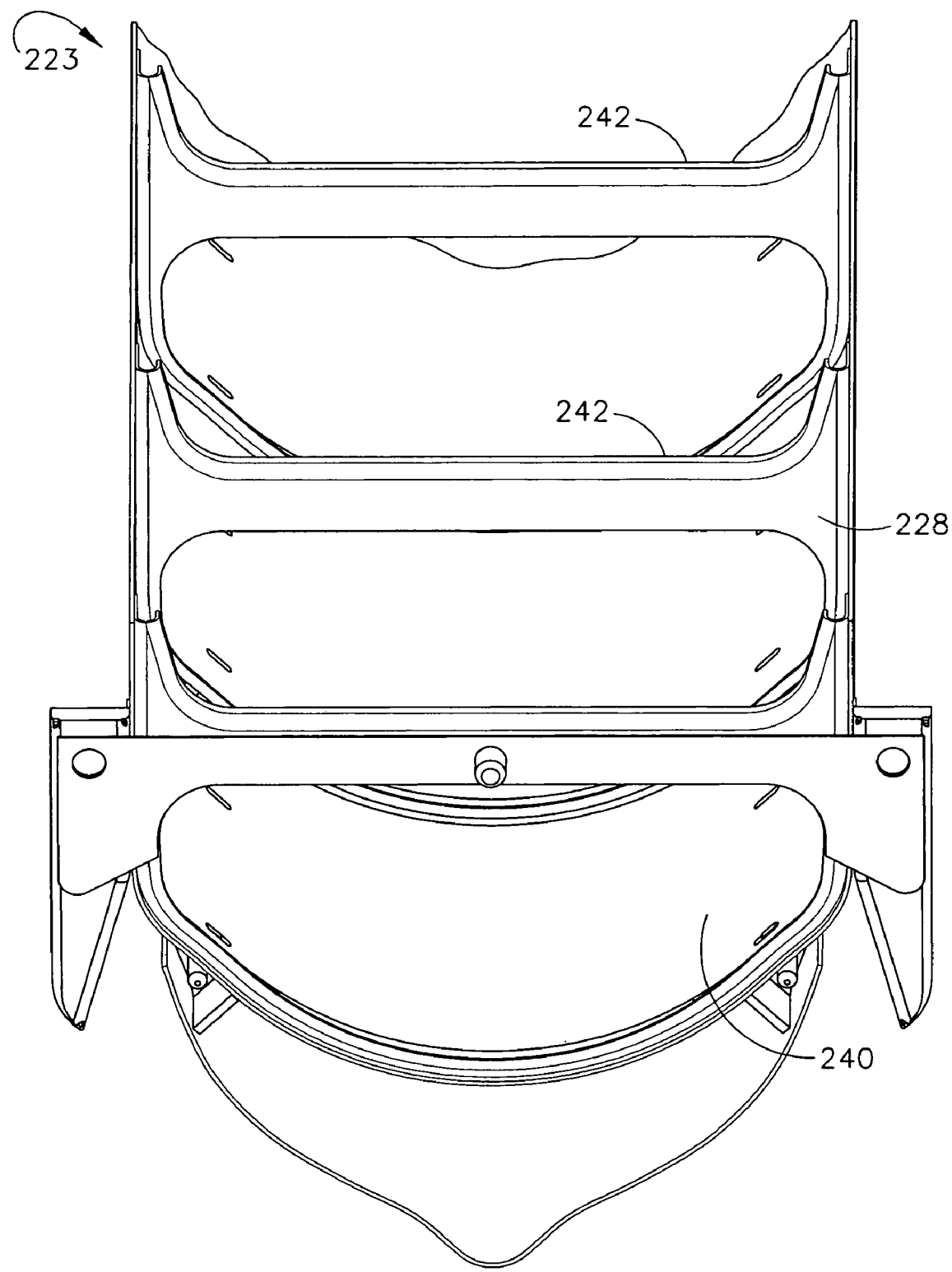
FIG. 7 is a perspective view of a large baffle.

FIG. 6 is a perspective view of the baffle system 222. Reference is also made to FIG. 3. The baffle system 222 also is in the path of the hot exhaust gases. In order to reduce the IR signature, the coating of the present invention has been applied to certain surfaces of baffle system 222. The coating has been applied to the aft rear face 226 of the large baffle 223 as shown in FIGS. 3 and 6. The coatings have also been applied to the D-rings 228 of the large baffle. And D-ring concave surface 240. The D-ring concave surface 240 extends across the rear of the baffle as shown in FIG. 7, a perspective view of the large baffle, while the D-ring includes strut 242 extending as a chord across the large baffle. The coating of the present invention applied to the D-rings 228 (including struts 242) and D-ring concave surface 240 reduces the IR signature of the present invention. The coating of the present invention is also effectively applied to flaps 250, 252, 260 and 262 of the large baffle to further reduce the IR signature of the baffle, which is heated by the hot exhaust gases passing through it.

As noted above, the general coating composition of an applied, dried and fired coating utilized for suppression of IR comprises about 30-80% refractory oxide pigment, optionally up to about 15% of a glass-forming material, about 5-20% binder, about 1-15% potassium oxide ($K_2O$) and the balance refractory oxide powder. Unless otherwise noted, all compositions are provided in weight percent.

While refractory oxides include tantalum (Ta), tungsten (W), rhenium (Re), niobium (Nb), molybdenum (Mo) and chromium (Cr), the preferred refractory oxide pigment for the application of the present invention, which is infrared suppression, is lanthanum strontium manganate (LSM). LSM is particularly effective in absorbing infrared radiation in wavelengths between 2-12 μm and dissipating the infrared radiation as thermal energy, heat, at a higher wavelength. LSM is present in the amount of 30-80% by weight. Although the LSM may be present across a broad range, the LSM, is a particularly dense material. The use of the dense LSM must be balanced against the competing requirement to maintain gas turbine engines used in aircraft applications as light as possible. The benefits of using LSM in order to minimize IR signature typically offsets the weight gain from using this material.

The binder is a material that forms the matrix and is present in amounts from 5-20%. The binder is preferably a silicate-forming material. The preferred matrix is potassium silicate, however other matrix materials, such as sodium silicate, lithium silicate, aluminum silicate materials also may be formed. When the matrix formed is a potassium silicate matrix, the binder can be a potassium silica-containing precursor. It will be recognizes that the precursor selection will be a major factor in determining the matrix composition The preferred precursor for a potassium silicate matrix is KaSil. The specific potassium silicate used to form the matrix of the present invention is Calsil 55 available from Calvery Industries of Cincinnati, Ohio. Casil 55 has a specific potassium to silicate ratio with a high solids loading, about 52.5% solids. This precursor is preferred because, on firing, it results in a high percentage, consistent with the 52.5% solids, of conversion to silicate, which is desirable.

Up to about 15% of a glass-forming material is added, to promote the formation of a glassy matrix. The preferred glass-forming material is $TiO_2$, although any other glass forming material may be used. The glass-forming material in combination with the binder material promotes the formation of a glassy matrix. For the preferred precursor material, a potassium silicate, the glass-forming material with the water glass, is converted upon firing to a ceramic material.

$K_2O$ is provided as a residual material in the matrix. After firing, although the preferred potassium silicate is a water glass with a high loading of silica, the potassium does produce an oxide uniformly distributed through the matrix.

Refractory oxide materials are added as the balance. Typically, refractory oxide materials are added from about 20-50%. The preferred refractory oxide material is alumina, $Al_2O_3$, although other refractory oxide materials such as magnesium oxide, zirconium oxide, both stabilized with yttria and unstabilized, hafnium oxide, chromium oxides. These oxides are added to tailor the coefficient of thermal expansion of the coating. In one embodiment, up to 10% of magnesium oxide (MgO) is added as one of the oxides, the balance being a combination of other oxides, although alumina is a preferred oxide. The MgO is added to assist in raising the melting point of the glass. The preferred alumina is A-16SG, a highly activated alumina available from ALCOA Aluminum of Pittsburgh, Pa. Alumina A-16SG is a preferred alumina because it has an average size in the range of about 0.4 μ-2.0 μ. This size range is effective in producing a desired reactivity with water glass upon firing, making the final coating insoluble in water or when contacted with water.

The material is applied as a thin coating over these baffles and exhaust nozzle surfaces. Because of the location in the exhaust nozzle of the engine, the coating material, in order to be survivable, in addition to being able to affect the infrared radiation, must be erosion resistant as the gases passing over the coating travel at a high velocity, providing the thrust that moves the aircraft forward. The coating material also must be resistant to environmental damage such as corrosion and/or oxidation at high temperatures, as the exhaust gases of a gas turbine engine includes, in addition to the products of combustion, all of the impurities that are in jet fuel, JP-8.

The effective coating composition for suppression of IR comprises, in weight percent about 30-80% lanthanum strontium manganate (LSM), optionally up to about 15% titanium dioxide ($TiO_2$), optionally up to about 10% manganese oxide (MgO), about 5-20% amorphous fused silicon dioxide ($SiO_2$), about 1-15% potassium oxide ($K_2O$) and the balance aluminum oxide ($Al_2O_3$).

The coating of the present invention is most effective when it is rough. Because the material is applied as a thin coating, about 3-12 mils thick, this roughness can be achieved by applying the coating over a roughened substrate. To achieve the required substrate roughness, the base material is first grit blasted. Then a wire spray bond coat is applied over the base material, which forms the roughened substrate. This rough surface finish assists in increasing the final coating roughness. The coating of the present invention is then applied to provide a surface finish of about 1100 microinches $R_a$ or rougher. The coating with this final coating roughness provides better off-angle performance, which can be observed with reference to FIGS. 8-10. In a preferred embodiment the base material forming the HIRSS is Inconel 625. A bond coat comprising NiCrAlY is wire-sprayed over the base material after the Inconel 625 base material has been grit blasted; thereby providing the substrate with the desired surface finish.

The material of the present invention may be applied to the selected surfaces of the HIRSS discusses above by spraying, painting or rolling. It is possible to cast a tape of the coating material and apply it to the selected surfaces of the HIRSS by adjusting the composition provided below to provide a composition with a viscosity suitable for casting, followed by drying. However, a slurry is prepared for application by spraying, painting or rolling by mixing together a composition comprising 30-80% refractory oxide pigment, preferably LSM, up to about 15% glass forming compound, preferably $TiO_2$, and 10-50% refractory oxide, in a preferred embodiment further comprising up to 10% MgO and the balance alumina These materials are mixed with 5-50% of the matrix precursor, prefereably potassium silicate (KaSil) and about 1-15% glycerin. Glycerin is added to assist in solids loading. It assists in controlling viscosity and acts as a surfactant. It is completely soluble in water and assists in preventing flashing upon heating, which is essential in avoiding the formation of blisters. If desired, up to 5% of a surfactant, such as sodium polymethacrylate, prefereably Darvan No.7 available from R. T. Vanderbilt Co, is added. Finally, depending upon the method of application of the coating to the material, water is added and the composition is adjusted to achieve a viscosity compatible with the method of application. The composition is thoroughly mixed to uniformly distribute the component materials through the slurry.

If the coating composition is sprayed, the slurry viscosity should be low, so relatively more water is required to achieve a viscosity that is conducive to spraying. If the coating composition is to be brushed or rolled, the slurry viscosity should be higher and relatively less water should be added to achieve a viscosity that is conducive to rolling or brushing. After applying the coating, it is allowed to dry. It is then fired by heating the coating composition to a temperature in excess of about 1200° F., and preferably about 1650° F. The coated article is heated at a rate of about 10° F./min. The glycerin will burn out during heating at a different and higher temperature than the water, so flashing is prevented. A temperature of at least about 1200° F. is required to promote the formation of a matrix in which bonding is essentially glass-ceramic. Below this temperature, the matrix is essentially a polymer/glass. More specifically, it is a water glass, which undesirably is soluble in water. However, after firing to a temperature in excess of 1200° F., the coating is converted into a glass-ceramic which is unaffected by water. After the coating has been fired, preferably to about 1650° F. for about one hour, it has the capability of surviving extended exposure to temperatures of about 1800° F., which is above the current temperature capability of the aircraft utilizing engines that employ HIRSS.

The coating can be applied in multiple passes to achieve the desired coating thickness. The coating is allowed to dry between passes. The coating thickness typically is in the range of about 1-12 mils, with a thickness of about 3-5 mils (0.003-0.005") obtained by liquid spraying, to give complete coverage of the roughened bond coat that is sprayed to a thickness of about 8-12 mils (0.008-0.012") by wire spraying NiCrAlY. Of course, the thickness can be adjusted to be thicker or thinner as desired or required for complete coverage. When applied by the preferred spraying method, the air pressure can be varied as desired. The air pressure should be sufficient to achieve the desired spray pattern.

When dried and fired the coating of the present invention should exhibit a surface finish of about 1100 microinches $R_a$. This surface finish is attributable to the relatively coarse refractory oxide component, as well a surface preparation that preferably includes wire sprayed roughened bond coat comprising NiCrAlY. A rough surface finish, greater than about 800-900 microinches $R_a$ contributes to the off-angle IR reduction capabilities of the present invention as will be discussed below. Although the material absorbs IR, any IR that is not absorbed is emitted in diffuse directions by the rough surface finish, rather than being strongly reflected such as in a form resembling a beam, thereby improving the detectability by IR sensors. While any other refractory oxides may be used in the composition, as discussed above, the selection of the size of the refractory oxide should be selected based on providing a coating having a surface finish that emits any unabsorbed IR in diffuse directions. The refractory oxide selected should be sized to produce a surface finish of about 1100 microinches $R_a$ or greater on the substrate; typically a roughened bond coat applied over a superalloy base metal. This may vary, depending on the refractory oxide material selected, however, refractory oxide material having an average size of alumina A-16SG (about 0.4 microns) or greater should produce a satisfactory surface finish.

Figure 8:
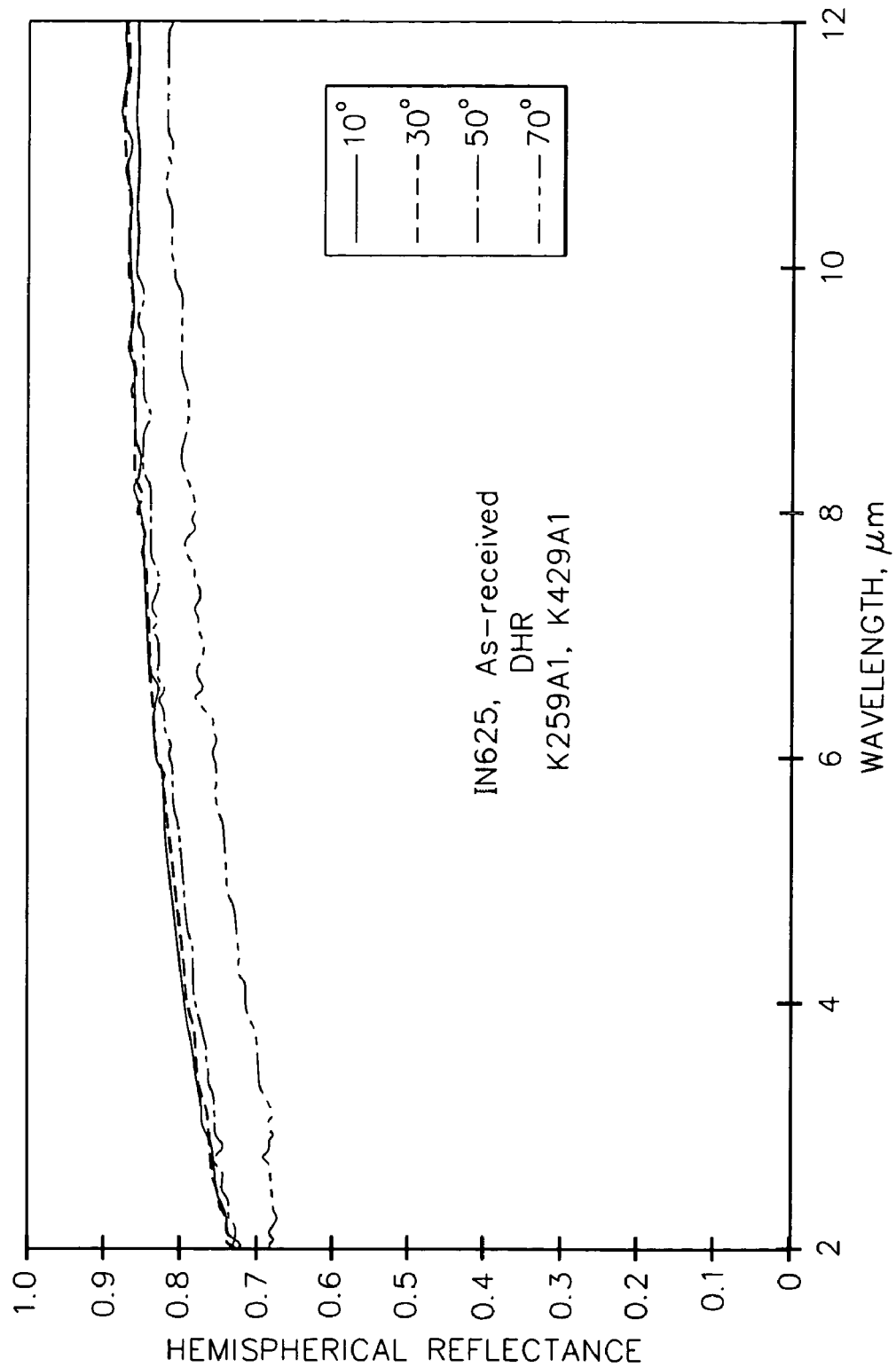
FIG. 8 is a graph of the hemispherical reflectance v. infrared wavelength of an uncoated Inconel 625 surface at ambient temperature.
Figure 9:
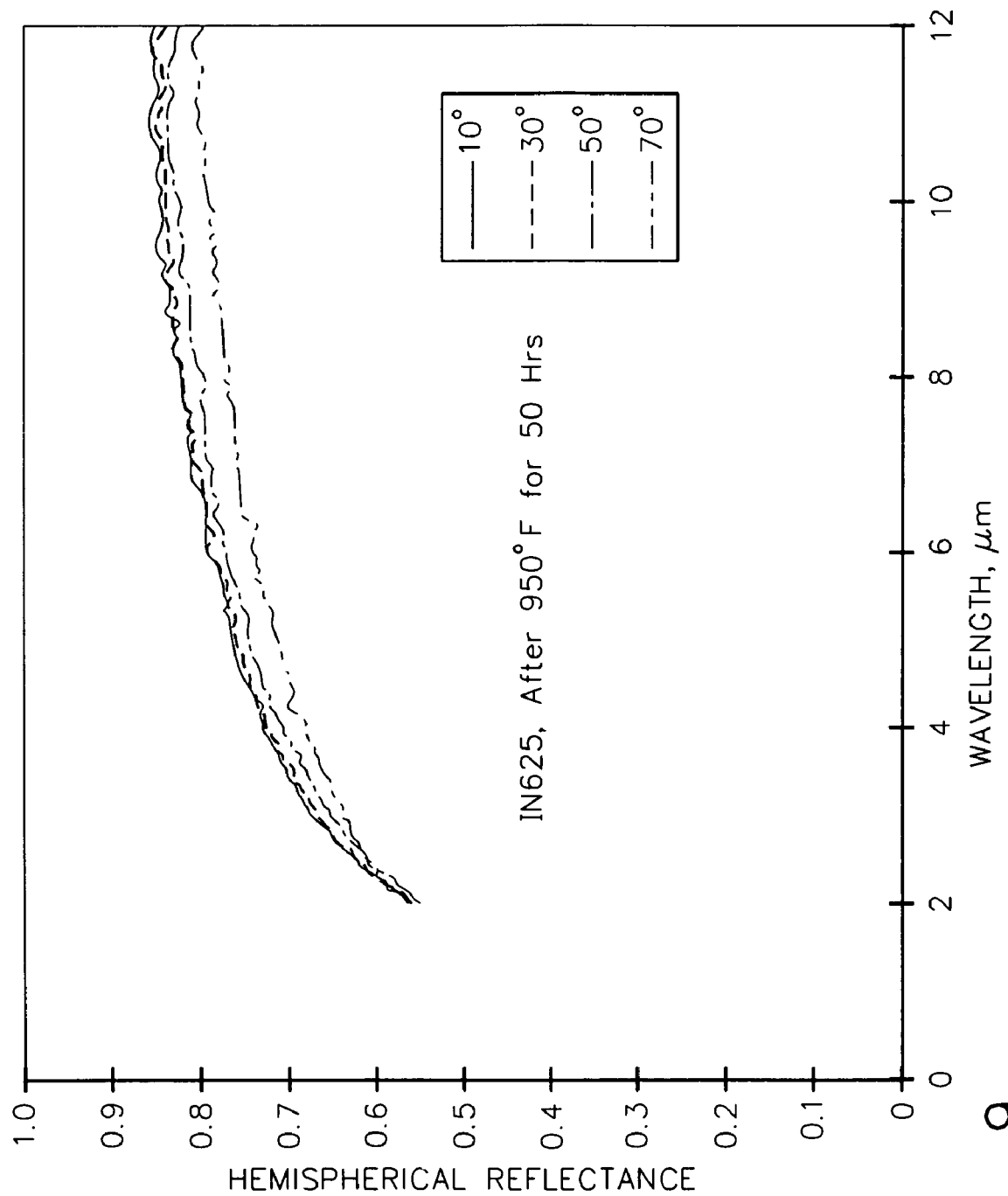
FIG. 9 is a graph of the hemispherical reflectance v. infrared wavelength of an uncoated Inconel 625 surface after elevated temperature exposure.

The performance of the coating in reducing IR is presented in FIGS. 8, 9 and 10 as graphs of hemispherical reflectance vs. wavelength, where wavelength is the wavelength of the infrared radiation. These graphs represent both infrared radiation reflected by an article as well as infrared radiation incident on the article and reflected from it. The infrared radiation was measured at angles of 10°, 30°, 50° and 70°, as measured from perpendicular to the surface. FIG. 8 depicts the hemispherical reflectance of Inconel 625 in the as received condition in the range of about 2-12 µm. Inconel 625 was selected as the superalloy material as this material is the primary material used for the HIRSS, although the behavior of other metallic materials is expected to be about the same. There is very little change in hemispherical reflectance from the material across the IR band from 2 µm to about 12 µm. As the graph indicates, Inconel 625 is a good reflector of IR in this wavelength range. Alternatively stated, it is a poor absorber of IR, so that a component having exposed Inconel 625 would be readily detectable by IR techniques, and this detectability is largely independent of the angle of the detector with respect to the surface.

FIG. 9 differs from FIG. 8 in that it displays the hemispherical reflectance of Inconel 625 after 50 hours at 950°. As indicated in the graph, the reflectivity of the Inconel 625 remains high, that is, the material remains non-stealthy or readily detectable by detecting means such as radar, at these temperatures in the 2-12 micron range, although there is a slight decrease in hemispherical reflectance (reflectivity) in the 2-4 micron range.

FIG. 10 is a graph of hemispherical reflectance of an Inconel 625 sample coated with the coating of the present invention. This coating is identified as GEHEC-180. This graph indicates that the hemispherical reflectance of the sample is reduced from about 70-80% for an uncoated sample of Inconel 625, as indicated by FIG. 8 to about 10% as indicated in FIG. 10. At a angle of about 70°, the reflectance was slightly higher, about 15-20%, which is still a significant reduction as compared to an uncoated metal. The coated sample retained its high emissivity after thermal exposures.

Thermal analysis indicates that the use of the coating of the present invention, GEHEC-180, on selected areas of a HIRSS, as set forth above, installed in a gas turbine engine, such as the GE T-700, reduces engine IR signature. A demonstration HIRSS system coated with GEHEC-180RBC coating on selected surfaces, as set forth above, and an uncoated HIRSS system were tested on an aircraft. The uncoated HIRSS formed the baseline for measuring the IR from the aircraft. Measured system IR reduction from the coated HIRSS as compared to the uncoated IR showed improvements that substantially matched the improvements displayed by the Inconel 625 samples set forth in FIGS. 8-10. The GEHEC-180 coating provides a substantial reduction to the IR signature when applied to selected surfaces of a HIRSS system as set forth above.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hover infrared suppression system for a gas turbine engine comprising:
a hover infrared suppression system having an upstream first stage, a second stage downstream from the first stage and a third stage downstream from the second stage, the engine operating as a temperature sufficient to cause the hover infrared suppression system to emit infrared radiation;
a high emissivity coating applied over at least one of the stages of the hover infrared suppression system to reduce the infrared radiation emitted from the engine; and wherein the high emissivity coating as applied, comprises, in weight percent, about 30-80% refractory oxide pigment, about 5-20% binder, about 1-15% potassium oxide, optionally up to about 15% glass-forming material and the balance refractory oxide powder.

2. The infrared suppression system of claim 1 wherein the high emissivity coating is applied to the second stage of the hover infrared suppression system, wherein the second stage is intermediate between the upstream first stage and the downstream third stage, the second stage including an upstream end and a downstream end, the downstream end of the second stage including a flange overlapping an upstream end of the third stage.

3. The infrared suppression system of claim 2 wherein the high emissivity coating is applied to a surface of the second stage flange.

4. The infrared suppression system of claim 3 wherein the high emissivity coating is applied to an inner diameter of the second stage flange.

5. The infrared suppression system of claim 3 wherein the high emissivity coating is applied to an inside surface of the second stage flange.

6. The infrared suppression system of claim 1 wherein the high emissivity coating is applied to the second stage.

7. The infrared suppression system of claim 6 wherein the high emissivity coating is applied to an aft rear face of the baffle system.

8. The infrared suppression system of claim 6 wherein the high emissivity coating is applied to a D-ring concave surface.

9. The infrared suppression system of claim 6 wherein the high emissivity coating is applied to a D-ring strut.

10. The infrared suppression system of claim 6 wherein the high emissivity coating is applied to baffle system D-rings.

11. The infrared suppression system of claim 6 wherein the high emissivity coating is applied to baffle system flaps.

12. A high emissivity coating for application to a hover infrared suppression system having three stages, the coating applied to at least one of the stages to reduce the infrared radiation emitted from the engine, comprising
as applied, in weight percent, about 30-80% refractory oxide pigment, about 5-20% binder, about 1-15% potassium oxide, optionally up to about 15% glass-forming material and the balance refractory oxide powder.

13. The high emissivity coating of claim 12 wherein the refractory oxide pigment includes about 30-80% lanthanum strontium manganate.

14. The high emissivity coating of claim 12 wherein the binder is a material that forms a matrix.

15. The high emissivity coating of claim 12 wherein the binder forms a silicate matrix.

16. The high emissivity coating of claim 15 wherein the binder is selected from the group consisting of potassium silicate, sodium silicate, lithium silicate and aluminum silicate.

17. The high emissivity coating of claim 12 wherein the optional glass-forming material promotes the formation of a glassy matrix.

18. The high emissivity coating of claim 17 wherein the optional glass forming material is $TiO_2$.

19. The high emissivity coating of claim 12 wherein the refractory oxide material is selected from the group consisting of $Al_2O_3$, magnesium oxide, zirconium oxide, hafnium oxide and chromium oxide.

20. A method for applying a high emissivity coating to a hover infrared suppression system comprising the steps of:
providing a hover infrared suppression system:
preselecting surfaces of the suppression system for coating;
providing a high emissivity coating comprising, in weight percent, about 30-80% refractory oxide pigment, about 5-20% binder, about 1-15% potassium oxide, optionally up to about 15% glass-forming material and the balance refractory oxide powder;
grit blasting the preselected surfaces to provide a grit blasted surface finish;
applying a coating of NiCrAlY by wire spraying over the grit blasted surface finish to provide a surface finish of about 1100 microinches $R_a$;
adding water to the coating to provide a predetermined viscosity and mixing;
applying the high emissivity coating to a preselected thickness over the NiCrAlY coating;
drying the high emissivity coating evaporating the water;
repeating the steps of applying the coating and allowing the coating to dry until a thickness of about 0.001-0.012 inches is achieved and a coating surface finish of at least about 1100 microinches $R_a$ is achieved;
heating the applied, dried coating at a rate of about 10° F./min. to a firing temperature of at least about 1200° F. to obtaining a surface finish of 1100 microinches $R_a$ or rougher, the coating reducing the hemispherical reflectance of infrared radiation of the hover infrared suppression system as compared to uncoated hover infrared suppression systems by at least about 15-20% at angles perpendicular to the surface.

* * * * *